July 3, 1923.
C. A. FAIRBANKS
1,460,954
EDUCATIONAL SIGN
Filed Oct. 30, 1922
4 Sheets-Sheet 2
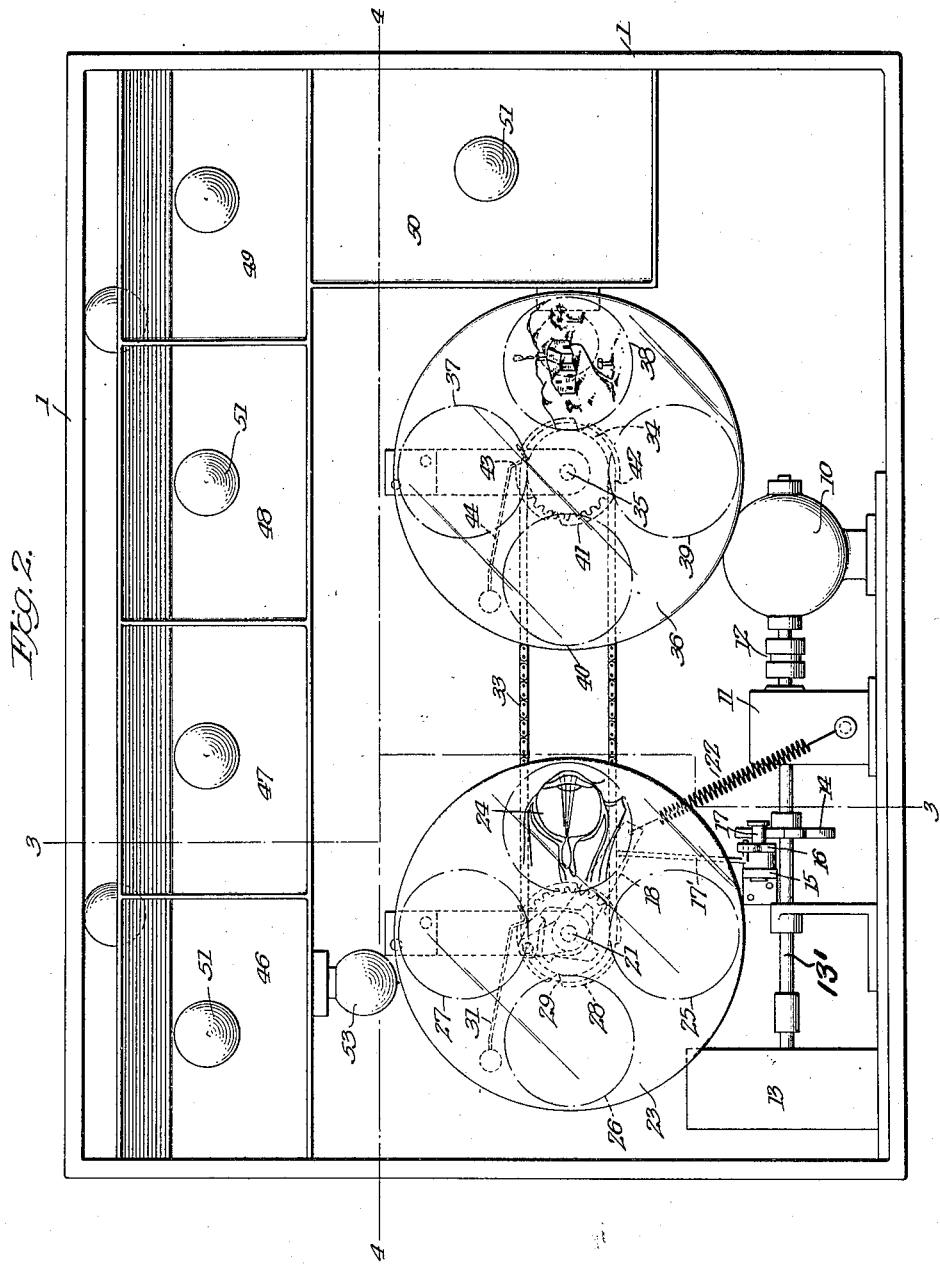
C. A. Fairbanks
INVENTOR
BY Victor J. Evans
ATTORNEY
WITNESS:

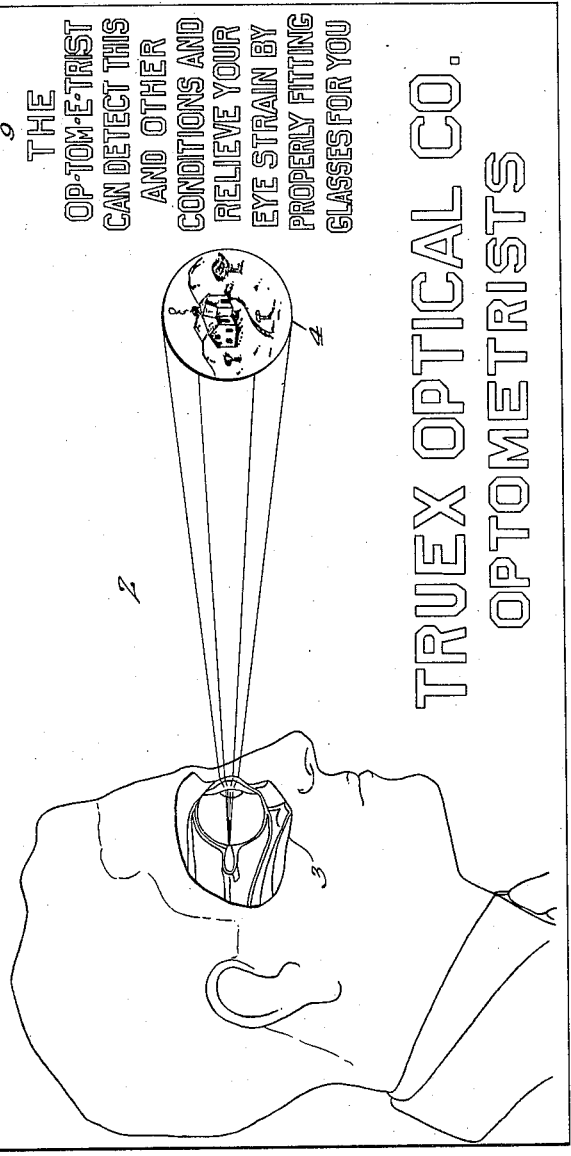

July 3, 1923.
C. A. FAIRBANKS
EDUCATIONAL SIGN
Filed Oct. 30, 1922
1,460,954
4 Sheets-Sheet 3
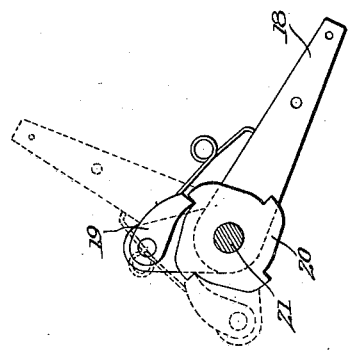
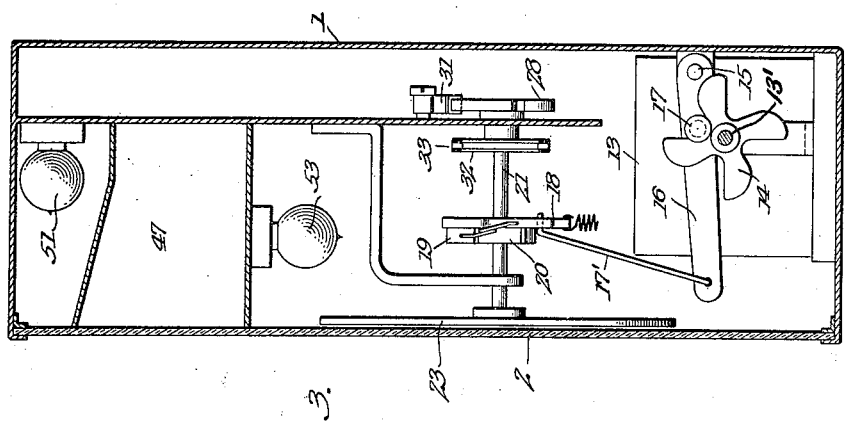
C.H.Fairbanks.
INVENTOR
BY Victor J. Evans
ATTORNEY
WITNESS:

July 3, 1923.

C. A. FAIRBANKS

EDUCATIONAL SIGN

Filed Oct. 30, 1922

C. A. Fairbanks
INVENTOR

BY Victo J. Evans
ATTORNEY

WITNESS:

Patented July 3, 1923.

1,460,954

UNITED STATES PATENT OFFICE.

CARL A. FAIRBANKS, OF WICHITA, KANSAS.

EDUCATIONAL SIGN.

Application filed October 30, 1922. Serial No. 597,948.

*To all whom it may concern:*

Be it known that I, CARL A. FAIRBANKS, a citizen of the United States, residing at Wichita, in the county of Sedgwick and State of Kansas, have invented new and useful Improvements in Educational Signs, of which the following is a specification.

My present invention has reference to improvements in electric signs and is particularly directed to signs for optical advertising and demonstrating purposes.

In carrying out my present invention, I propose to produce an electrically operated sign having upon its outer face the representation of a person's head and having a picture directly in the line of vision thereof, the eye portion of the representation being arranged upon a revoluble disk, the picture or other representation being likewise arranged upon a revoluble disk, both of said disks being normally concealed so that only the eye and the picture thereof is disclosed, while means is provided for revolving the disks in timed relation to each other and for flashing light rays from the eye on to the picture or representation, the anatomical drawings of the eye and the views on the disk representing respectively a normal eye and a normal picture as viewed by a normal eye, a farsighted eye and a distorted picture as viewed by the farsighted eye, a nearsighted eye and a distorted picture as viewed by the nearsighted eye, and an astigmated eye and a picture as viewed by the eye, in addition to instructions with respect to the normal and distorted eyes, together with the manner in which the latter may be corrected, which latter are flashed successively on the sign as the respective disks are revolved to bring the drawings of the eye and the pictures into view.

The foregoing, and many other objects which will present themselves as the nature of the invention is better understood, may be accomplished by a construction, combination and operative association of parts such as is disclosed by the drawings which accompany and which form part of this application.

In the drawings:—

Figure 1 is a front elevation of an optical sign in accordance with this invention.

Figure 2 is a view with the face plate removed.

Figure 3 is a sectional view on the line 3—3 of Figure 2.

Figure 4:
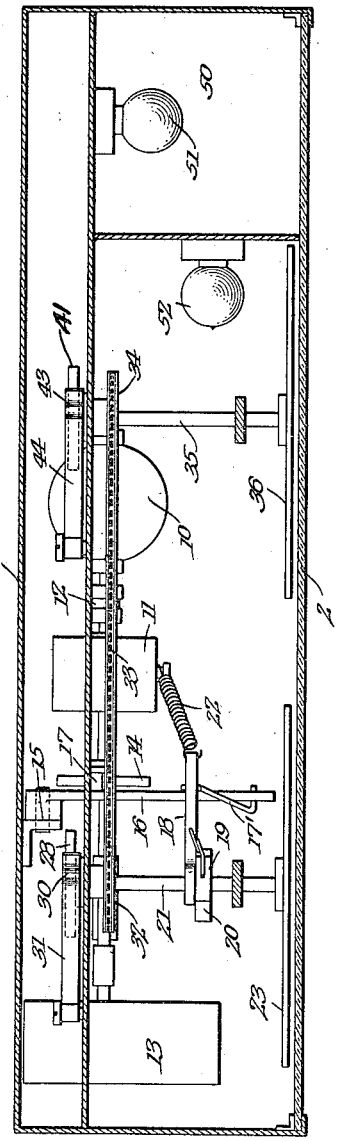
Figure 4 is a sectional view on the line 4—4 of Figure 2.
Figure 6:
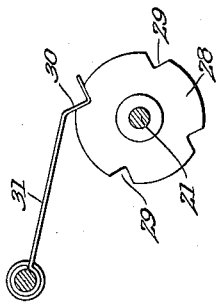

The remaining figures illustrate details.

As disclosed by the drawings, I make use of a substantially rectangular casing 1. On the outer face 2 of the casing there is printed the name of the company employing the sign and to one side thereof there is a drawing representing a human head. The eye portion of the head is formed with an opening 3, and on the face plate 2, in a straight line of vision with respect to the eye of the figure there is a round opening 4. Preferably the face plate 2 is constructed of glass which, however is rendered translucent, except at certain points thereon in which there are imprinted instructions with respect to a normal eye, indicated by the numeral 5, instructions with respect to a farsighted eye, indicated by the numeral 6, instructions with respect to a nearsighted eye, indicated by the numeral 7, instructions with respect to an astigmated eye, indicated by the numeral 8, and instructions as to the manner in which defected eyes may be remedied, indicated by the numeral 9. Light from electric bulbs is flashed through the letters representing these instructions in a manner which will presently be described.

In the casing 1 there is an electrically driven motor 10. On the shaft of this motor there are reducing gears arranged in a suitable housing 11. As a matter of fact the shaft of the motor is in two sections, clutch means 12 being provided for connecting or disconnecting the sections. The shaft of the motor also actuates a flasher 13, the same being of a construction similar to that disclosed in U. S. Patent. No. 1,343,141, granted P. J. Kenagy, on June 8, 1920.

On the shaft 13' there is secured a cam star wheel 14. The wheel has four cam-shaped arms, and the walls between the arms are mounted. Pivoted on a suitable support in the casing, as at 15 there is a lever 16. On the lever 16 there is journaled a roller 17 designed to be engaged between the cam arms of the star wheel 14. Connected with the lever there is a rod or lever 17' which in turn is pivotally connected to a lever 18 that carries a pawl 19 to engage a pawl wheel 20 on a shaft 21. Between the lever 18 and the housing 11 for the reducing gears there is a spring 22 that normally holds the lever 18 in one position. Secured on the shaft 21 there is a preferably glass disk 23, and on this disk there are imprinted four equi-distantly spaced anatomical drawings of the human eye represented by the numerals 24, 25, 26 and 27 respectively. On the shaft 21 there is a wheel 28 having its periphery provided with four equi-distantly spaced V-shaped notches 29. These notches are designed to be engaged by the U-shaped end 30 on a spring arm 31 that is suitably supported in the housing.

Also on the shaft 21 there is a sprocket gear 32 around which there is a sprocket chain 33 that engages a second sprocket wheel 34 on a shaft 35. The shaft 35 has keyed thereon a preferably glass disk 36, and on this disk there are imprinted at four separate points views of any desired character, the said views being indicated for distinction by the numerals 37, 38, 39 and 40 respectively. Also on the shaft 35 there is a wheel 41 having its periphery provided with four equi-distantly spaced V-shaped notches 42 which are designed to be engaged by the V-shaped end 43 of a flat spring 44, one end of the spring being suitably supported in the housing. The springs engaging the notched wheels are designed to hold the disks 23 and 36 from accidental turning.

In the housing to the rear of the respective signs 5, 6, 7, 8 and 9 there are lamp boxes 46, 47, 48, 49 and 50 respectively, and in each of these boxes there is an electric bulb 51 respectively. In addition to the bulbs 51 there is a bulb 52 which is always lighted as long as the sign is in operation and which is arranged directly opposite the representation on the disk 36 when the latter is brought opposite the opening 4 in the face plate 2. In this connection it should be stated that the drawings of the eye on the disk 23 are so positioned that the same are successively brought opposite the opening 3 in the face plate 2. An additional bulb 53 is arranged directly opposite the disk 23 and this bulb is lighted when the pictures of the eye on the disk 23 are brought opposite the opening in the casing therefor simultaneously with a view on the disk 36. The result is that rays of light are passed from the bulb through the opening opposite the disk 23 to be reflected on the view disclosed through the opening in the casing on the disk 36.

As previously stated, I make use of the electric contrivance set forth in U. S. Patent No. 1,343,141, so that a detailed description of this apparatus is not deemed necessary. The disks are slowly revolved and are held for a determined length of time incident to the lost motion provided by the operating shaft when the notched wheels 28 and 41 are engaged by the V-shaped ends of the spring arms 31 and 44, and when the normal eye 5 on the disk 23 is brought opposite the normal view 37 on the disk 36 only the bulb 53 and the bulb 48 which is arranged to the rear of the printed inscription 5, are lighted. When the motor again revolves the disks to bring the farsighted picture of the eye 6 opposite the view 38 on the disk 36, the lamp 53 and the lamp 42, which is opposite the printed instructions regarding the farsighted eye, and the lamp which is opposite the instructions regarding the manner in which such farsighted eyes may be remedied, are illuminated. The view displayed is distorted to show how the same is seen by a person having farsighted eyes. When the disks are again moved to bring a nearsighted eye through the opening in the casing and a view or picture first seen by a farsighted eye is brought opposite the opening 4 the lamp 53 is flashed as is the lamp 48, the lamp 42 having been extinguished, the lamp 50, however, being still lighted. As the disks are again revolved to bring to view an astigmated eye, and a picture as seen by such eye the lamp 50 is lighted, the lamp 53 flashing light between the openings 3 and 4, and the lamp to the rear of the instructions regarding the manner in which such defective eye may be remedied is also lighted. When the disks are again revolved to bring to view a normal eye and a picture as viewed by a normal eye all of the lamps, except the lamp 45 and the flasher bulb 53 are extinguished, the last mentioned lamps being illuminated.

The bulb 52 arranged to the rear of the pictures on the disk 36 is also illuminated as each of the said pictures is brought to view, and from the foregoing description when taken in connection with the drawings, it will be noted that I have produced an efficient optical sign or advertising device which is of a comparatively simple construction, but which will attract attention to effectively advertise the business of the optician using the sign. It is further to be understood that the nature of the invention is such as to render the same susceptible to such minor changes as fall within the scope of the attached claims.

Having described the invention, I claim :—

1. In a device for the purpose set forth, a casing, a motor operated shaft therein, comprising sections, reducing means whereby one of said sections is turned at a less rate of speed than the other, disks journaled in the casing to the rear of the openings, means actuated by the motor shaft for imparting an intermittent rotary movement to one of the disks, means between the disks whereby the same are simultaneously rotated so that the views thereof are successively brought opposite the openings, means for momentarily halting the disks when the views thereon are in such position, and means for illuminating the disks when in such position.

2. In an advertising device as herein described, a casing having spaced openings in the face thereof, a motor operated shaft, comprising two sections, means whereby one of said sections is turned at a less rate of speed than the other section, disks having views thereon journaled in the casing and disposed to the rear of the openings therein, means between the slower moving section of the shaft and one of the disks for imparting an intermittent rotary motion to said disk, spring means returning said motion imparting means to initial position, means between the disks whereby the same are simultaneously rotated, means for momentarily halting the disks when the views are brought opposite the openings, and means for illuminating the disks when in such position.

3. An optical advertising sign including a casing having openings in the face thereof and transparent indicia relative to eye conditions, a motor operated shaft in the casing, comprising two sections, means whereby one of said sections is turned at a less rate of speed than the other section, disks in the casing having views thereon, the views on one of the disks representing normal and diseased eyes, and the views on the other disk representing pictures as seen by the normal and diseased eyes, designed to be brought to align with the openings, shafts for the disks, a lever connected with one of said shafts, a spring influencing the same to one position, a star wheel on the slower turning section of the motor shaft, a pivoted lever having a roller in contact with the star wheel, a rod connection between the last and first mentioned levers, toothed wheels on the shafts of the disks, spring arms having V-shaped ends engaging the teeth of said wheels, means connecting the disks whereby the same are turned in unison, means for illuminating the views on the disks when brought opposite the openings, and means for illuminating the indicia as the separate views on the disks are brought opposite the openings whereby to impart information regarding the condition of the human eye, its defects, and manner of remedying the defects.

In testimony whereof I affix my signature.

CARL A. FAIRBANKS.